(12) United States Patent
Lundqvist

(10) Patent No.: US 6,240,891 B1
(45) Date of Patent: Jun. 5, 2001

(54) CYLINDER HEAD FOR INTERNAL COMBUSTION ENGINE

(75) Inventor: Ulf Lundqvist, Stockholm (SE)

(73) Assignee: Scania CV Aktiebolag (publ) (SE)

( * ) Notice: Subject to any disclaimer, the term of this patent is extended or adjusted under 35 U.S.C. 154(b) by 0 days.

(21) Appl. No.: 09/582,339

(22) PCT Filed: Dec. 21, 1998

(86) PCT No.: PCT/SE98/02402

§ 371 Date: Jun. 23, 2000

§ 102(e) Date: Jun. 23, 2000

(87) PCT Pub. No.: WO99/32779

PCT Pub. Date: Jul. 1, 1999

(30) Foreign Application Priority Data

Dec. 23, 1997 (SE) .................................................. 9704851

(51) Int. Cl.⁷ ................................ F02F 1/42; F01L 3/22; F01L 3/06
(52) U.S. Cl. ........................................................ 123/188.8
(58) Field of Search .............................. 123/188.8, 193.5

(56) References Cited

U.S. PATENT DOCUMENTS 4,011,852  3/1977  Rasch ................................ 123/188.8
5,860,401 * 1/1999  Adachi et al. ..................... 123/188.8

FOREIGN PATENT DOCUMENTS 0275841  7/1988  (EP) .
0723074  7/1996  (EP) .
2557637  7/1985  (FR) .

* cited by examiner

Primary Examiner—Marguerite McMahon
(74) Attorney, Agent, or Firm—Ostrolenk, Faber, Gerb & Soffen, LLP

(57) ABSTRACT

A cylinder head for a combustion engine of diesel type has an inlet duct (10) of so-called tangential type whose mouth leading into the combustion chamber (3) is controlled by a conventional mushroom valve (14). The valve cooperates with a valve seat (11) formed in a valve seat ring (12) which is arranged in a milled recess (13) which surrounds the mouth of the inlet duct (10). At a shoulder surface (19) formed by the milled recess (13) the valve seat ring (12) connects to the inlet duct (10) at a larger diameter than that exhibited by the inlet duct at the shoulder surface. The valve seat ring (12) further has, on its side facing radially inwards, an arcuate shape (20) on at least part of the valve seat ring (12) which defines the latter's throughflow area. This makes it possible for the inlet air leaving the inlet duct not to be subject to substantial disturbances of flow even if there is a certain lack of concentricity at the connection between the inlet duct (10) and the valve seat ring (12).

8 Claims, 1 Drawing Sheet

CYLINDER HEAD FOR INTERNAL COMBUSTION ENGINE

The present invention relates to a cylinder head and particularly to a valve seat ring in the mouth of the inlet duct to a combustion chamber of the engine.

BACKGROUND TO THE INVENTION, AND STATE OF THE ART

For combustion engines to be allowed to be sold they have to fulfil legal requirements regarding exhaust emissions. Meeting those requirements involves increasingly precise control of the engine's combustion. An important factor which affects the combustion process and hence the formation of harmful emissions and the efficiency of combustion is the air movement which occurs in the combustion chamber when the fuel is sprayed in and the combustion commences. This air movement is crucially affected by the movement imparted to the inlet air entering the cylinder as a result of the configuration of the inlet duct/ducts.

In diesel engines with double inlet valves and with relatively long inlet ducts of the type referred to in SE A 9203900-7 the movement imparted to the inlet air is at a relatively small angle relative to the piston plane and is at the same time substantially tangential relative to an imaginary circle which is smaller than and concentric with the cylinder. The ducts consequently impart to the inlet air a certain rotation which can be measured by means of laboratory facilities and be used for testing duct configurations with optimum characteristics for a chosen compromise.

The configuration of such ducts of the so-called tangential type and, more particularly, their mouth leading into the combustion chamber has been found to be of great significance for achieving the desired rotation of the inlet air. A problem which arises in the casting of large series of cylinder heads is maintaining sufficiently close tolerances on the position of the ducts. A risk which arises is that subsequent milling for the incorporation of a valve seat ring may not result in the latter being totally concentric with the duct. Irregularities affecting, inter alia, the shape of edges extending into the duct may therefore occur, with consequent adverse effects on the movement of inlet air into the cylinder, and may hence cause total disruption of the desired monitoring and control of the combustion process.

European patent specification EP-A-275841 shows a valve seat in an intake duct of an internal combustion engine. A milled recess in the inlet duct houses the valve seat equipped with bilateral chamfer. The purpose is to make the machining process for obtaining a valve seat in an inlet duct less expensive.

Swedish patent specification SE A 7501689-9 refers to the configuration of the mouth of an inlet duct leading into the combustion chamber in a diesel engine without stating how the movement of the inlet air is thereby affected. The inlet duct therein referred to is of the so-called spiral type which imparts to the inlet air a pronounced spiral-like movement which has at the same time a relatively powerful vertical component. This type of inlet air movement results in combustion which is relatively unfavourable from the emission point of view and is usually avoided in modern diesel engines.

OBJECT AND SUMMARY OF THE INVENTION

The object of the present invention is to provide in a diesel engine a configuration of the mouth of a so-called tangential inlet duct leading into the combustion chamber such that the tolerance requirements for the geometrical position in the cylinder head of the duct and/or of the valve seat ring can be maintained at a level which facilitates easy and efficient manufacture of the cylinder head. The present invention achieves this by providing a valve seat ring in a recess milled into the mouth of the inlet duct, wherein the valve seat ring has an arcuate shape extending convexly into the mouth of the duct along the height of the ring, the recess has an abutment shoulder facing out of the mouth of the duct and the valve seat ring abuts the shoulder surface of the recess, and where they abut, the valve seat ring having a greater diameter than the intersection between the shoulder surface and the mouth of the duct where the recess is milled, which ensures that sharp edges due to the valve seat ring do not protrude into the inlet duct and that the latter's configuration facilitates advantageous control of the flow of inlet air into the cylinder.

In one embodiment of the invention the valve seat ring has an arcuate configuration which extends up to the shoulder surface adjacent to the inlet duct and has at least in its upper portion a radius equal to between 10 and 50% of the height of the valve seat ring. This makes it possible for the inlet air leaving the inlet duct not to be subject to substantial flow modifying disturbances even if there is a certain lack of concentricity at the connection between the inlet duct and the valve seat ring. The result is satisfactory maintaining of the directional flow imparted to the air by the tangential inlet duct even during the entry of the air into the cylinder, with consequently good conditions for serially produced engines to maintain an inlet air flow into the combustion chamber which provides the desired characteristics from the emission and fuel consumption points of view.

In a further embodiment of the invention the connection of the inlet duct to said shoulder surface is via a substantially sharp edge. This means that the direction of flow of the inlet air can be controlled for as long as possible before it enters the cylinder, thereby further enhancing the possibility of achieving a desired inlet air flow in the combustion chamber.

BRIEF DESCRIPTION OF THE DRAWINGS

An advantageous embodiment of the invention is described below with reference to the attached drawings, in which.

DESCRIPTION OF AN EMBODIMENT OF THE INVENTION

Figure 1:
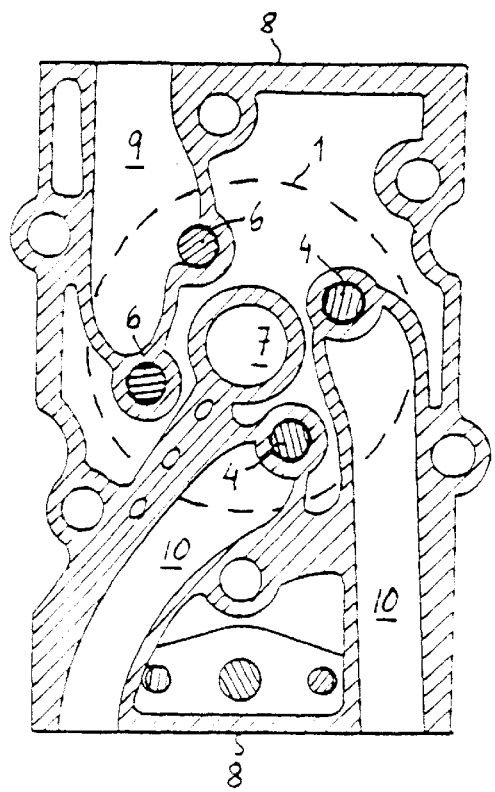
FIG. 1 shows a horizontal section through a cylinder head for a diesel engine cylinder with four valves.

In a diesel engine of the kind described in Swedish patent specification SE A 9203900-7, one of the separate cylinder heads exhibits a configuration of inlet and outlet ducts which is indicated by the horizontal section in FIG. 1.

The discontinuous line in the drawing represents the extent of the cylinder 1. The cylinder head 2 incorporates two inlet valves 4 and two exhaust valves 6 (represented in FIG. 1 by a cross-section through the respective valve stems) and a recess or hole 7 which is arranged centrally relative to, and also concentrically with, the cylinder 1 and is intended for a fuel injector (not depicted).

The cylinder head is thus intended for a four-valve engine in which the valves 4,6 are arranged in a rotationally angled configuration relative to the cylinder head side surfaces 8.

The cylinder head 2 is provided with an exhaust duct 9 through which exhaust gases flowing out via the engine's exhaust valves 6 can be led to its mouth leading into an undepicted exhaust manifold adjacent to one side 8 of the cylinder head 2. The exhaust duct 9 is common to exhaust gases from the two exhaust valves 6. The engine is further provided with two inlet ducts 10 which take the form of separate ducts to respective inlet valves 4 in order to lead inlet air to the combustion chamber of the cylinder 1 from an inlet pipe (not depicted) situated on the other side 8 of the cylinder head 2. The rotational angling of the valves 4,6 results in the inlet ducts 10 being of relatively long extent, affording the advantage that the inlet air to the cylinder 1 can be better controlled, since its flow can be influenced over a longer distance.

The result is that the direction of movement of the inlet air is at a relatively small angle to a here undepicted piston plane and is at the same time substantially tangential to an imaginary circle which is smaller than and concentric with the cylinder 1. The ducts 10 thus impart to the inlet air a certain swirl which is selected in order to create optimum conditions for combustion whereby the requirement for both low emissions and low fuel consumption can be fulfilled.

Figure 2:
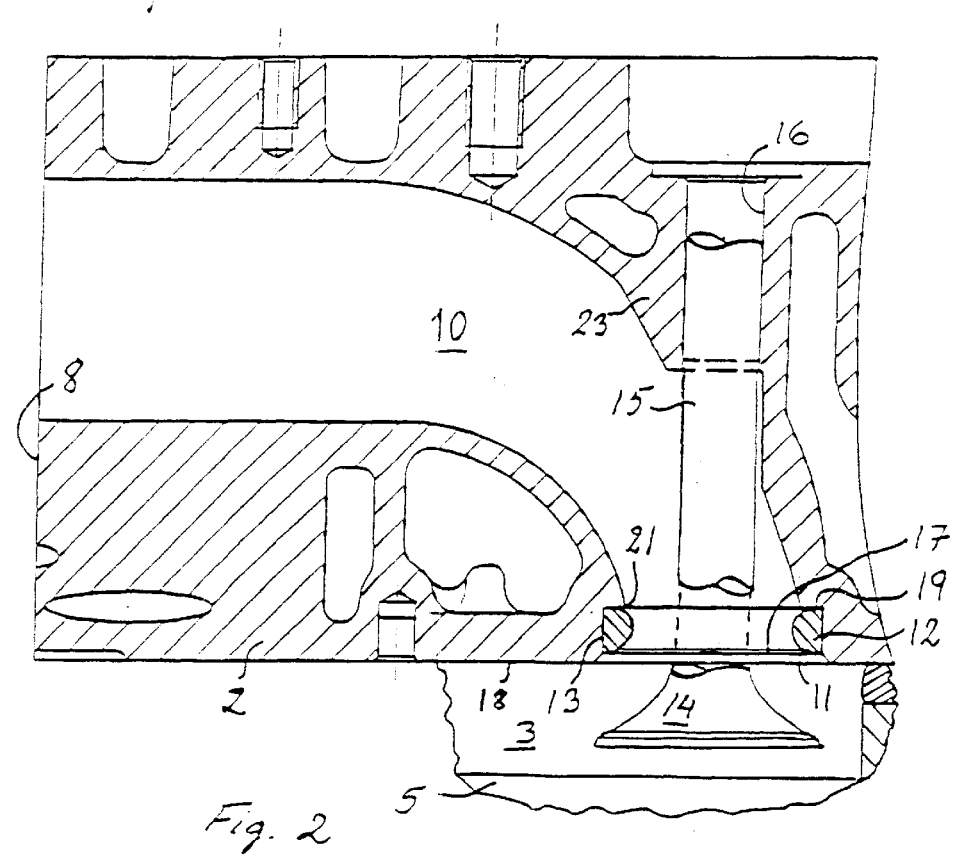

FIG. 2 depicts the mouth of one of the ducts 10 leading into the cylinder 1 as seen in a vertical section. The mouth is conventionally arranged with a valve seat 11 formed in a valve seat ring 12 which is pressed in a conventional manner into a milled recess 13 which surrounds the mouth of the inlet duct 10. The recess 13, also called the valve seat well, is concentric with a mushroom valve 14 which cooperates with the valve seat 11 and which has a reciprocating movement parallel with the center line of the cylinder 1, i.e. in the case of a cylinder 1 placed vertically the mushroom valve 14 has a vertical movement. The mushroom valve 14 has a valve stem 15 supported in a valve guide 16 whose lower end incorporates a boss 23 which protrudes into the inlet duct 10. The valve seat ring 12 exhibits the same cross-section all round and has a substantially horizontal lower limiting plane 17 which, in the fitted position, is situated at a vertical distance from the lower plane 18 of the cylinder head. This distance corresponds substantially to the distance by which the valve head protrudes below the limiting plane 17, thereby making it possible to obviate any recess in a piston 5 running in the cylinder 1. Said recess is otherwise usually required to prevent the mushroom valve 14 colliding with the piston 5 during operation of the engine. This means that the piston will be of simpler design, thereby likewise creating more advantageous conditions for well monitored and controlled combustion.

The process of casting the cylinder head 2 results in the positions of the inlet ducts 10 being within certain dimensional tolerances. The machining of the cylinder head and the valve seat wells 13 situated round the mouths of the inlet ducts 10 is based on the position of the valve guide 16 and hence the vertical movement of the valve 14. Within the given tolerances, this may result in the position of the wells 13 being somewhat displaced relative to the mouths of the inlet ducts 10. Providing the valve seat ring 12 with an arcuate surface 20 along its upper portion makes it possible to ensure that even in the case of relatively large tolerances the valve seat ring 12 will not protrude in any flow-disrupting manner into the inlet duct 10. The valve seat ring 12 will thus connect to the inlet duct 10 at a shoulder surface 19 formed by the milled recess 13. This entails the connection to the inlet duct being by means of an arcuate shape 20 extending up to the shoulder surface 19 at a larger diameter than that exhibited by the inlet duct 10 at the shoulder surface 19. The arcuate shape 20 provides the valve seat ring 12 with a smaller inside diameter than the minimum diameter of the inlet duct 10 and forms a constriction which increases the velocity of the inlet air flowing into the cylinder.

The connection of the inlet duct 10 to the shoulder surface 19 is via a relatively sharp edge 21 in order to make possible, in the pocket which the arcuate shape 20 of the valve seat ring 12 forms with the shoulder surface 19, a certain controlled vortex immediately after the edge. This moderate vortex influences the inlet air flow so that the constriction formed by the valve seat ring 12 has a substantially reduced effect on the inlet air flow, and direction of flow, into the cylinder. The result is a desired relatively great insensitivity of the valve seat arrangement to different dimensional relationships of the constituent parts so long as they are within stipulated manufacturing tolerances. Despite such variations, the inlet air may thus achieve a desired controlled tangential inflow into the cylinder, thereby creating good possibilities of serially manufactured engines achieving the combustion desired from the emission and fuel consumption points of view. It is thus essential that the inside diameter of the valve seat ring 12 where it abuts against the shoulder surface 19 be larger than the aggregate of the diameter of the inlet duct 10 and the maximum manufacturing tolerances applicable thereto.

Figure 3:
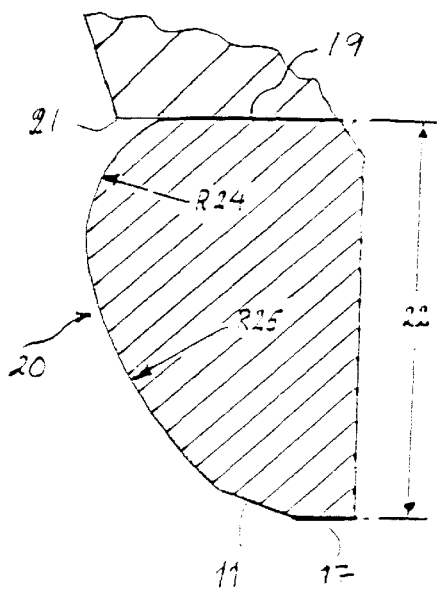
FIG. 2 shows schematically a section through one of the inlet ducts at its entry to the cylinder and FIG. 3 shows a cross-section through a valve seat ring applied to the invention.

It has been found essential that the arcuate shape 20 of the valve seat ring 12 extends up to the shoulder surface 19 connecting to the inlet duct and that at least in its upper portion it should have a radius equal to between 20 and 50% of the height 2 of the valve seat ring (see FIG. 3). It is also possible, however, for radii equal to as little as 10% of the height of the valve seat ring to produce good effects if the extent in the radial direction of the pocket delineated by the edge 21 and the arcuate shape 20 exceeds about 10% of the height of the valve seat ring. Said extent in the radial direction is with advantage smaller than about 50% of the largest cross-sectional width of the valve seat ring.

The arcuate shape 20 consists with advantage of at least two separate circular arcs of which the upper arc has a substantially (about 40–50%) smaller radius R24 than the radius R25 of the lower arc. The transition between the two arcs is situated substantially where the valve seat ring 12 has its smallest throughflow area.

What is claimed is:

1. A cylinder head for a diesel combustion engine which has at least one cylinder, wherein the cylinder head is on the cylinder and a piston moves through the cylinder toward and away from the cylinder head defining a combustion chamber in the cylinder head;

at least one air inlet duct extending through the cylinder head to the combustion chamber, the inlet duct having an inlet for air and having a mouth oriented for outlet of air leading into the combustion chamber in a direction tangential to the combustion chamber;

a reciprocating mushroom valve moveable with respect to the mouth of the duct selectively moveable for opening the mouth for passage of air into the combustion chamber and for closing the mouth against passage of air, a guide in the cylinder head for supporting the mushroom valve to reciprocate between opening and closing the mouth;

the cylinder head having a recess in the mouth of the inlet duct and the recess surrounds the mouth of the duct, the recess being shaped and defined by a shoulder surface in the mouth, the shoulder surface extends radially outwardly into the recess and faces generally toward the air outlet of the mouth, the shoulder surface meeting the duct at a first diameter in the duct;

a valve seat ring which is separate from the duct and is received in the recess around the mouth of the duct; the valve seat ring having an exposed side facing in to the duct and out of the recess, along at least part of the side of the valve seat ring, the ring has a radially inwardly convex, generally arcuate shape and the arcuate shape of the valve seat ring side extends up to the shoulder surface of the recess; the arcuate shape has an upper portion that is toward the shoulder surface and has a radius of curvature equal to between 10 and 50% of the height of the valve seat ring in the recess and along the duct, and the valve seat ring being shaped with respect to the recess, such that the diameter of the valve seat ring where the valve seat ring contacts the inlet duct at the shoulder surface is larger than the diameter of the inlet duct where the duct meets the shoulder surface, the valve seat ring is somewhat into the recess where the ring contacts the shoulder surface.

2. The cylinder head of claim 1, wherein the inlet duct meets the shoulder surface at a substantially sharp edge, and the valve seat ring at the shoulder surface has a larger diameter than the sharp edge.

3. The cylinder head of claim 1, wherein the valve seat ring has an identical cross section circumferentially around the entire valve seat ring.

4. The cylinder head of claim 3, wherein the inlet duct meets the shoulder surface at a substantially sharp edge, and the valve seat ring at the shoulder surface has a larger diameter than the sharp edge.

5. The cylinder head of claim 2, wherein the exposed side of the valve seat ring has an inside diameter facing into the duct and spaced away from the shoulder surface wherein the inside diameter is larger than the aggregate of the inlet duct, and the maximum manufacturing tolderances of the inlet duct whereby the valve seat ring projects out of the recess into the inlet duct.

6. The cylinder head of claim 1, wherein the recess in the inlet duct near the mouth thereof is a milled recess.

7. The cylinder head of claim 1, wherein the cylinder head has a lower surface facing into the cylinder and the recess and the valve seat ring therein are positioned above the lower surface of the cylinder head providing space for receiving the mushroom valve therein.

8. The cylinder head of claim 1, wherein the valve seat ring has an inside diameter which at a section along the height of the ring is of smaller diameter than the mouth of the duct, thereby narrowing the duct.

* * * * *